United States Patent
Weston et al.

(10) Patent No.: US 12,485,912 B2
(45) Date of Patent: Dec. 2, 2025

(54) TRACK / OFF ROAD MODE UX EMISSIONS AND FUEL LABEL COMPLIANT USING GEOFENCING

(71) Applicant: FORD GLOBAL TECHNOLOGIES, LLC, Dearborn, MI (US)

(72) Inventors: Keith Weston, Canton, MI (US); Derek Bier, Ann Arbor, MI (US); Matthew Blake Tranter, Brighton, MI (US); Peter Douglas Kuechler, Canton, MI (US); Brendan F. Diamond, Grosse Pointe, MI (US); Ryan O'Rourke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 814 days.

(21) Appl. No.: 17/240,072

(22) Filed: Apr. 26, 2021

(65) Prior Publication Data
US 2022/0340154 A1 Oct. 27, 2022

(51) Int. Cl.
*B60W 50/08* (2020.01)
*B60W 50/04* (2006.01)

(52) U.S. Cl.
CPC ........ *B60W 50/082* (2013.01); *B60W 50/045* (2013.01); *B60W 50/085* (2013.01); *B60W 50/087* (2013.01)

(58) Field of Classification Search
CPC ................................................ B60W 60/0023
See application file for complete search history.

(56) References Cited

U.S. PATENT DOCUMENTS

| | | | |
|---|---|---|---|
| 9,415,779 B2 | 8/2016 | Popham et al. | |
| 2008/0154671 A1* | 6/2008 | Delk | G06Q 30/02 |
| 2010/0082225 A1* | 4/2010 | Bournel | B60W 50/0098 |
| | | | 701/115 |
| 2011/0077807 A1* | 3/2011 | Hyde | G06Q 30/02 |
| | | | 903/903 |
| 2014/0051489 A1 | 2/2014 | Pierucci et al. | |
| 2017/0326976 A1* | 11/2017 | Burt | B60K 17/3515 |
| 2018/0023692 A1* | 1/2018 | Gauthier | F16H 61/0213 |
| | | | 701/55 |
| 2018/0308299 A1 | 10/2018 | Pfeiffer et al. | |
| 2018/0361972 A1* | 12/2018 | Zagorski | B60W 30/10 |
| 2019/0047583 A1* | 2/2019 | Sikorski | B60W 50/0098 |
| 2019/0294162 A1* | 9/2019 | Sikorski | B60W 50/0098 |
| 2022/0297546 A1* | 9/2022 | Bennett | B60L 53/67 |

FOREIGN PATENT DOCUMENTS

EP 2689982 B1 11/2017

* cited by examiner

*Primary Examiner* — Wade Miles
*Assistant Examiner* — Jerrod Irvin Davis
(74) *Attorney, Agent, or Firm* — Joseph Zane; Brooks Kushman P.C.

(57) ABSTRACT

A vehicle determines that a vehicle enhanced driving mode has been requested. The vehicle determines whether a condition for engaging such a mode has been met. Additionally, the vehicle offers a user-override, when the condition has not been met and the condition is a condition defined as over-rideable and responsive to override acceptance, engaging the requested driving mode. In other instances, the vehicle monitors mode usage against predefined maximum usage constraints, and may facilitate excess mode usage if constraints are exceeded.

4 Claims, 3 Drawing Sheets

TRACK / OFF ROAD MODE UX EMISSIONS AND FUEL LABEL COMPLIANT USING GEOFENCING

TECHNICAL FIELD

The illustrative embodiments generally relate to systems and methods for enhanced vehicle mode usage monitoring and control.

BACKGROUND

Modern vehicles are becoming ever more powerful and capable of dynamically adapting to detected and user-indicated driving situations. This includes, for example, changing drive modes to adapt to weather conditions, which can change powertrains, suspensions, etc. For example, a user recognizing a weather condition could request a change to drive mode. Or, a vehicle detecting wheel slippage, could react by changing a drive mode or adjusting a powertrain.

It may even be possible to change emissions and noise produced by a vehicle by shifting a high-performance vehicle into a given driving mode. Users want access to driving modes when they are needed, often purchasing performance vehicles for just such modes. At the same time, regulatory bodies may want to restrict usage of such modes. Manufacturers want to be able to provide the capability their customers demand, while meeting regulatory requirements.

SUMMARY

In a first illustrative embodiment, a system of a vehicle includes a processor configured to determine that a vehicle enhanced driving mode has been requested. The processor is further configured to determine whether a condition for engaging such a mode has been met. Additionally, the processor is configured to offer a user-override, when the condition has not been met and the condition is a condition defined as over-rideable and responsive to override acceptance, engaging the requested driving mode.

In a second illustrative embodiment, a system of a vehicle includes a processor configured to detect a condition associated with engagement of an automatic mode-change for a drive mode. The method further includes, responsive to detecting the condition, determine if usage of a first mode resulting from the mode change exceeds a permissible limit. The method also includes automatically changing the drive mode to the first mode, when the usage does not exceed the permissible limit.

In a third illustrative embodiment, a computer-implemented method includes engaging an enhanced driving mode having a regulatory usage limitation associated therewith, in a vehicle, wherein usage-tracking is designated for usage of the driving mode. The method also includes tracking usage of the driving mode while the driving mode is engaged. The method further includes determining whether the regulatory usage limitation is exceeded, based on the tracked usage and reverting to a non-regulated driving mode responsive to a determination that the usage limitation is exceeded.

DETAILED DESCRIPTION

Figure 1:
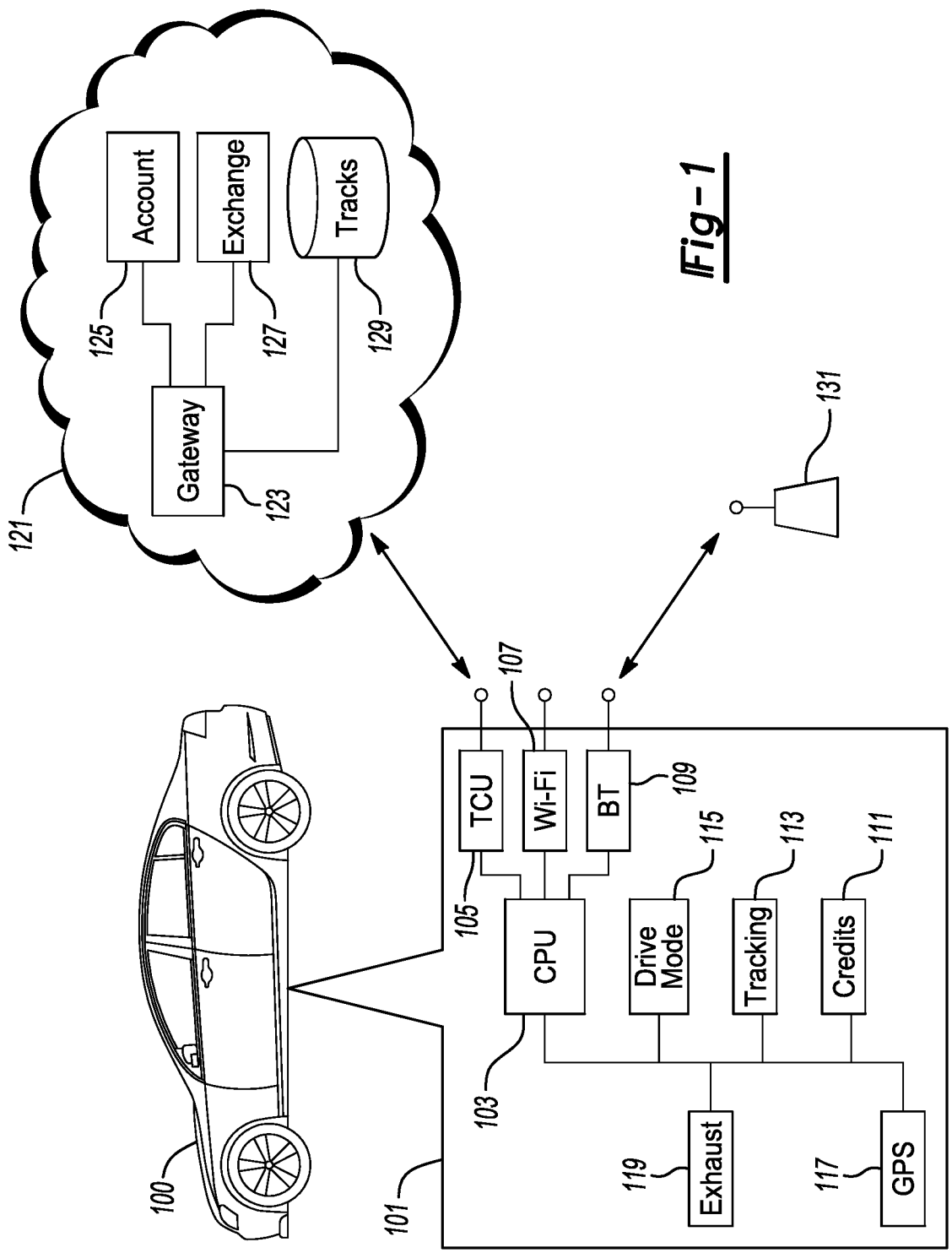
FIG. 1 shows an illustrative example of a vehicle computing system and a cloud-based communication system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments present examples of vehicles that can dynamically adapt to provide a ride-mode or vehicle system adjustment, either on-demand or responsive to detecting certain conditions. To the extent that such a change results in increased emissions, noise or other regulated aspect, the vehicles may also be capable of limiting those aspects to certain times of day or certain total usage per day, week, month, etc. Such a regulatory framework, while not perfectly desirable for users, could provide an opportunity for performance users to obtain certain amounts of usage and even to trade that usage to others via, for example, a credit swap or exchange.

Vehicles can change drive modes reactive to conditions, requests, geo-fences (e.g., mandatory low-noise control in residential areas), beacons, etc. Databases of tracks and permissible high-exhaust and high-noise zones, for example, may let a vehicle know where it is geographically permissible to enable such features. If usage is regulated in net total for a user, the vehicle can track usage, limit usage when limits are exceeded, and even provide for interaction with an exchange where a user can buy or swap for more usage rights from another user.

Databases of permissible zones for use of certain vehicle modes may be created and curated by both tracks and users. So, for example, a new user creating an off-road track could keep track of a route via GPS or other coordinates and upload a path indicating a route. A new track being setup as a pay-to-use or government provided (e.g., at a state park) course, may also be added to the database. Users may be able to access records of public tracks, privately created and shared tracks, nearby tracks, etc. The vehicle may even offer to alert a user if usage credits have expirations, so as to notify the user that certain usage credits must be used or lost. In such a scenario, the user may also elect to trade the credits to someone else in exchange for the ability to obtain later usage credits at a more convenient time.

In this manner, high performance vehicles can be provided with the features, systems and adaptability that users want, while maintaining regulatory compliance, if such regulation exists or comes into existence. The vehicles are adaptable enough that they could be provided with limiting systems via software and firmware upgrades, even after production, allowing for high performance vehicle delivery without fear of those vehicles running afoul of regulatory hurdles in the future.

FIG. 1 shows an illustrative example of a vehicle computing system and a cloud-based communication system. In this illustrative example, a vehicle 100 may have an onboard computing system 101, that can be comprised of various software, firmware and hardware components. Electronic control units (ECUS), software modules, etc. all can contribute to the makeup of the overall onboard system and any of these may be used or provided, as required, to adapt and adjust other vehicle systems, including mechanical systems.

In this example, a processor, or one or more processors 103 is in communication with a variety of vehicle systems, such as, for example, communication system including a telematics control unit TCU 105, a Wi-Fi transceiver 107, and a BLUETOOTH transceiver 109. These systems, and other similar wireless communication systems, provide for both short-range and long-range communication capability.

For example, TCU 105 can be used in conjunction with a cellular connection to communicate with the cloud 121, as can Wi-Fi transceiver 107. The TCU can leverage an onboard phone device or a user brought-in device, and the Wi-Fi transceiver 107 can leverage local paid or free network connections, such as dedicated short range communication transceivers, home and personal Wi-Fi Networks, free networks along routes, etc.

BLUETOOTH transceiver 109 can be used to communicate with local devices, such as phones, as well as beacons 131 that may be used to indicate a track. For example, a track owner can set up a series of beacons that indicate when mode usage is permissible and where, and a vehicle 100 being in communication with such beacons 131 can react to detection of a beacon by enabling certain drive modes that might be desired or even otherwise restricted from use.

The processor 103 can be in communication with a variety of onboard hardware and software modules, such as, for example, drive mode control modules 115, usage tracking modules 113, credit modules 111, GPS and other navigation modules 117 and exhaust and noise control systems 119. While these systems may be described collectively for the sake of illustration, it is appreciated that these systems can comprise various hardware and software systems and are not necessarily collectively controlled. For example, exhaust and noise control modules 119 may include a variety of vehicle subsystems and are described collectively to illustrate that emission and noise may be dynamically controlled in certain vehicles.

Such adaptive systems may include, for example, track-mode systems for certain vehicles designed to be usable on race tracks. These systems can optimize shift points, throttle response and shift parameters enabling faster, easier track performance. Changing shift schedule and character may affect vehicle emissions, but if such use were limited to certain locations and/or overall usage times, this may provide an acceptable balancing effect for regulators. Customers would potentially be willing to exchange usage limits in order for the right to at least be able to use such advanced driving under certain circumstances.

In another example, tracking and/or credit storage applications and systems may track usage of certain limited systems and/or storage user credits and entitlements to use such systems. Users may be geographically or time-limited in usage of such systems, and onboard tracking can help maintain usage within limits as well as provide an opportunity to allow users to exchange usage credits with other users, keeping net usage below goals while providing more active users an opportunity to use the systems more and providing more passive users with a financial or usage-credit in exchange. For example, there may be swap markets and/or dollar based markets that users can exchange credits or sell credits on.

An exchange may take the form of swapping an expiring credit for use of a credit later, and the vehicle systems of both owners could track such exchanges, e.g., if credits expire weekly, one user could swap an expiring credit at week's end for use of an extra credit the following week.

The user giving the next weeks credit could have an extra hour of advanced system usage (if such usage were regulatorily limited) in the present week, but an hour less in the following week.

GPS systems 117 may be used to track coordinates when creating tracks, and may be used to determine whether a vehicle is within a geo-fence designated for a track. Geofences can be established, for example, based on automatic boundaries established around known or developed tracks (e.g., automatically drawing a polygon around the track) or may be specifically established for tracks by a track creator (e.g. by a user specifying boundaries around the track to indicate when a vehicle is "on" the track or nearby enough to enable performance systems).

In conjunction, these and similar systems may act to provide both advanced vehicle control and automatic monitoring of vehicle system usage, providing a satisfactory experience for users and regulatory agencies alike.

The cloud 121 may provide connected back-end services such as, for example, a connection gateway 123 and account services 125, exchange services 127 and databases 129. The gateway can serve to direct user and system requests to the appropriate locations. The account services can hold user credit records, user usage records, user private track data, user performance data, etc. The exchange may enable users to exchange credits as described above and in greater detail below. The databases may hold public and private track records, as well as any regulatory requirements that may apply to a given track and/or permissible use-modes available for usage on a track.

So, for example, a user might access the cloud to obtain a local track from database 129. The user can see, at that moment if desired, that the track permits performance mode usage and that the user is low on usage credits or usable time, if such concepts apply. The user can then access exchange 127 to obtain additional usage and the user's account and vehicle profile can be updated to reflect any changes. The user can then travel to the track and when the user is within a geofenced boundary, the user's vehicle may automatically engage performance mode, or offer the mode as an enabled option if it is otherwise enabled. Interaction with mode changes and the vehicle systems can be achieved through use of physical and digital in-vehicle controls, for example, such as dials, switches, displays, etc.

Figure 2:
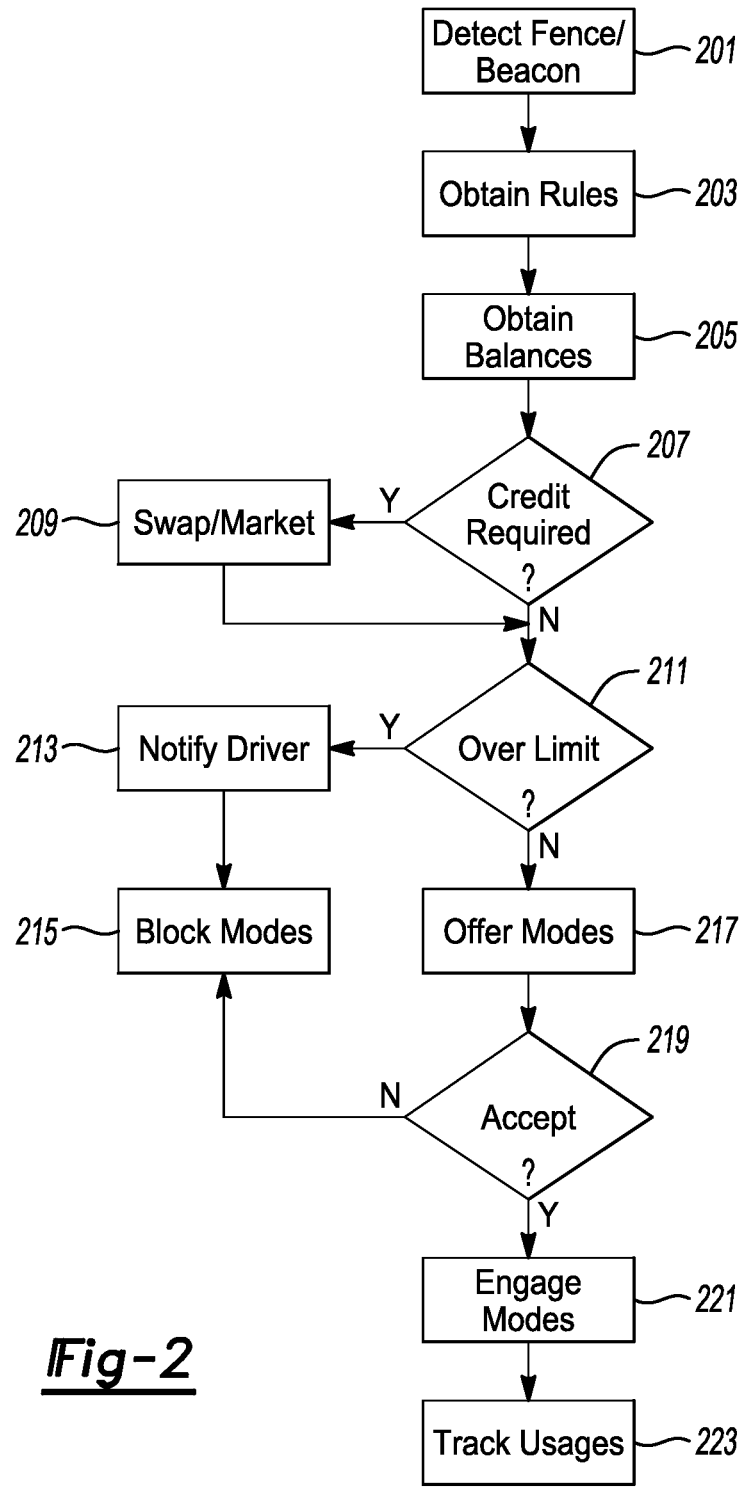
FIG. 2 shows an illustrative example of a mode-engagement and usage-tracking process.

FIG. 2 shows an illustrative example of a mode-engagement and usage-tracking process. In this example, the vehicle 101 CPU may utilize a mode-control process that detects local beacons 131 and/or whether geo-fences corresponding to permissible or suggested mode-usage have been crossed. Mode usage may not be limited, but may be most beneficial under certain circumstances, and so even if the beacons and geo-fences do not serve to create a regulatorily defined boundary, they may serve to create a suggested boundary for mode usage (e.g., it might be highly inefficient to use a baja-driving-mode on the highway).

In this example, the process detects a beacon at 201 or determines that a vehicle 100 has passed within a geo-fenced boundary, for example. These are a few non-limiting examples of when automatic engagement can occur. In response to the vehicle 100 being in a state or location for automatic mode engagement, or if a user has requested mode engagement, the process may obtain any applicable rules at 203. For example, certain track data accessible from a database or a local beacon broadcast may indicate which modes can be used on the track, if regulations apply. Other sources of regulatory information, whether government or track-owner based, may also display which modes are permissible. Such data may automatically limit mode usage in certain circumstances and may simply work as a recommendation for mode usage in others. Recommendations, limitations and suggested modes may be displayed on an in-vehicle display, along with any automatic actions taken and/or user-selectable options pertaining to mode-engagement.

If there are regulatory limits on mode usage, the process may also obtain a user account balance at 205. For example, users may be regulated to 10 hours per month of excess emission, and may be required to purchase (from the government or other users) or swap usage credits to exceed this limit. The balance can show a user how much credit remains, if such a system is applicable.

Figure 3:
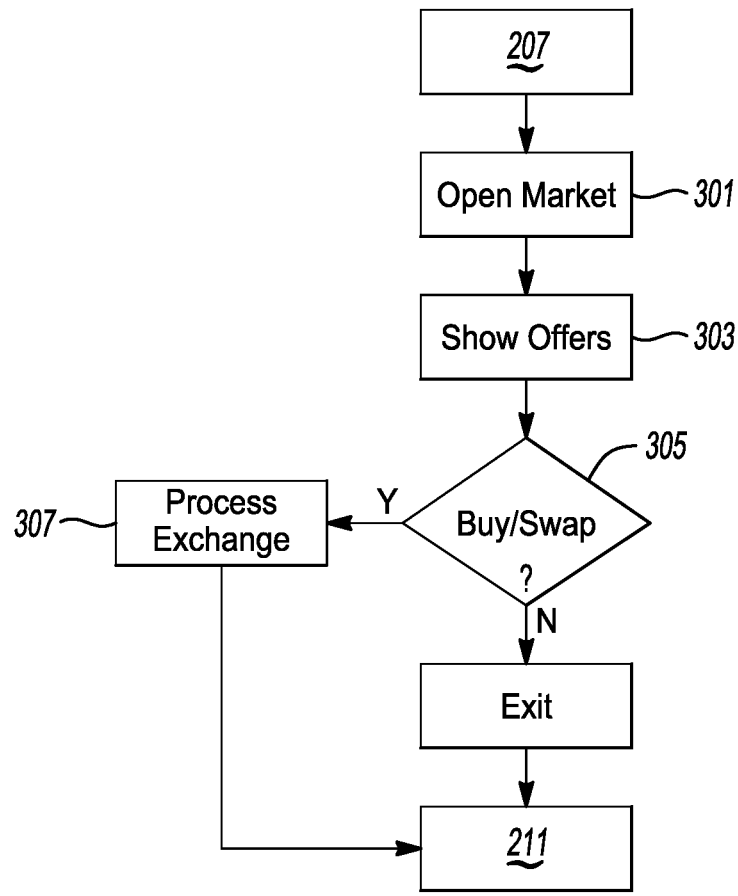
FIG. 3 shows an illustrative example of a mode-credit exchange process.

If the user lacks sufficient credit to engage a system and/or use the system for as long as a user would like at 207, the process may engage an exchange process at 209, which is described in greater detail with respect to FIG. 3. If the user does not want to launch the exchange, the process may proceed to determine if a user is over a regulatory usage limit at 211. If regulations apply, the process may notify the user at 213 and block mode usage at 215. At any point, if an exchange is available, the user may elect to access an exchange to enable more credit usage.

If the advanced modes are not over limit on usage at 211, the process may not automatically engage the modes in some instances, especially if credit limit usage applies. For example, a user may want to familiarize themselves with a track before engaging in an advanced performance mode usage. So the user may be offered a number of selectable or blockable modes at 217, and given an opportunity to accept at 219. If they user does not accept at 219, the mode(s) may be blocked until the user later requests engagement. This can prevent inadvertent usage of credit-limited modes.

Automatically in some cases (e.g., where limits do not apply) and on user-demand in other cases, the process may engage a selected or appropriate driving mode. Recommended modes can be digitally and wirelessly indicated as above, and/or displayed to a user for selection if automatic enablement of the best mode or a recommended mode is not desired. To the extent that regulation applies, and/or for the sake of user performance statistics, the process may also track mode usage at 223.

FIG. 3 shows an illustrative example of a mode-credit exchange process. If there is regulation or restriction on the usage of certain modes, based on, for example, emission, noise, etc., then this may create an opportunity for a marketplace in money or credit-swaps for such usage. FIG. 3 shows a non-limiting example of how this may work.

If a user has used their restricted time, for example, and wants to continue to use a performance mode, then the user can access a marketplace in-vehicle via, for example, a vehicle display. The market can display an account balance, funds or credits available, and other mechanisms for exchanging usable credits. Credits can be swapped with other users (by, for example, giving credits you won't use now for credits you might use later), or bought. Credits can be stored and tracked onboard the vehicle, so a user purchasing or swapping for 2 extra hours of usage can immediately continue to use their advanced systems and maintain usage within regulatory limits.

In this example, the process opens a marketplace application at 301, responsive to a user request or, for example, responsive to a determination that limited credits are running low or have been used up. If credits expire during a driving session, there may be some overrun permitted, or the modes may be disabled as soon as is safe. But if the user can also near-instantaneously buy or trade for additional credits, this can prevent excessive downtime and allows most casual users to maximize the usage of their credits in net—i.e., if the credits are weekly or monthly, and a user only goes to a track one week a month or one out of three months, the users can exchange credits with each other to maximize usage for when a given user is actually able to make it to the track.

The marketplace may show a plurality of offers for monetary or swap prices on credits at 303, either showing an open market, for example, or showing a user-group within which credits have been agreed to be exchanged. People may feel more comfortable or prefer to keep credit swaps between friends, and this may avoid anyone in a group of friends having to buy credits on the open market, so to this end it may be possible to be selective about with whom one is exchanging credits.

If the user elects to buy or swap credits at 305, the server 127 can process the exchange of credits and store a record of the exchange in the user account 125 and in a tracking and credit wallet 111 on the vehicle 100. If there is payment required, a financial account linked with a user account 125 can be debited or credited for the transaction. While such a marketplace is not necessary to the functioning of the illustrative embodiments, it is an example of how regulatory limits can be met while maximizing mode usage in a usage-limited schema.

Figure 4:
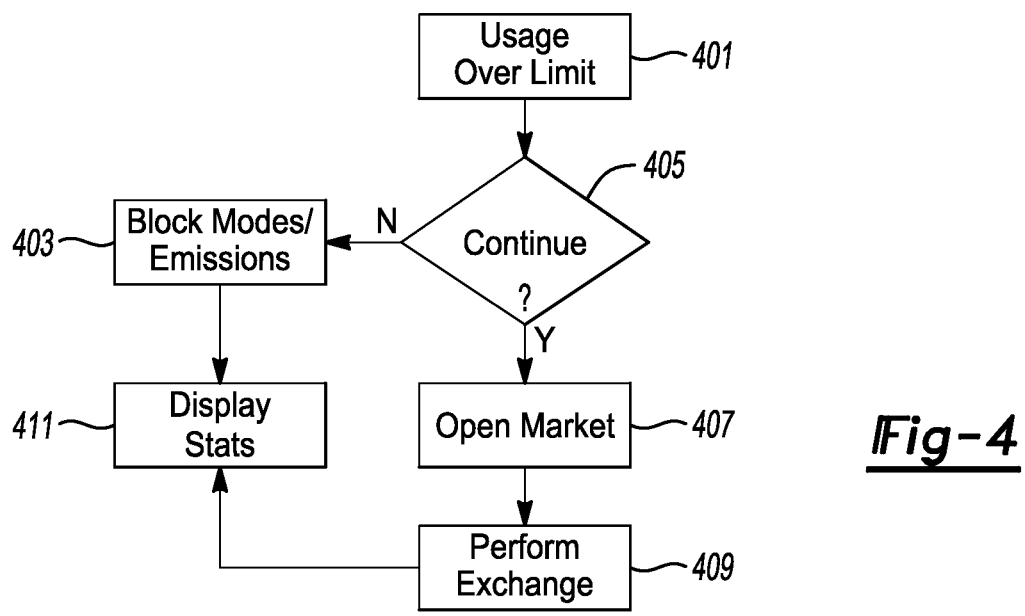
FIG. 4 shows an illustrative example of a mode-limiting process.

FIG. 4 shows an illustrative example of a mode-limiting process. For any number of reasons, which can include, for example, efficiency, regulation, driver preferences, etc. it may be desirable to disable and/or enable certain usage modes at certain locations. Different optimizations may apply to different vehicles and so certain modes may be recommended for one vehicle and not for another, given current conditions, terrain-state, etc. Recommendations associated with a track can be for a given model or broadly applicable, depending on which is appropriate. Recommendations may be static or dynamic in nature, meaning they may be adaptive to weather conditions, for example, if certain mode usage under certain conditions is inadvisable.

In this example, the mode-limiting triggers based on over-use, but that is merely illustrative and the limiting or recommended limiting could trigger based on a variety of factors. The steps of the process would or could vary following a different reason for limiting—e.g., weather-limited mode may be an option, regulatory limiting may be mandatory. Nonetheless, the vehicle 100 can be capable of mode limiting and may also provide mitigation options (e.g., the marketplace) for at least certain limited modes.

Here, the process, such as tracking process 113, determines that mode usage is over a limit at 401. The process 113 may base this on a tracked usage onboard in the form of usage credits or hours 111, or based on information stored in a user account 125. Of course, if a driver is in the middle of a session, the driver may not want to simply cease driving or cease enhanced-mode usage, so the process 113 gives the driver an option to continue the usage or cease the usage at 405.

Here, because the law may mandate usage limiting, when the driver elects to continue the usage at 405, the process 113 may present a market at 407 where the user can obtain more usage credit or hours. The user can use the market to perform an exchange at 409, and the vehicle 100 can display the obtained usage credits or hours in, for example, the amount of additional time under which the user can or can likely continue to use enhanced modes. For example, if mode usage is based on emission, then there may not be a time limit in total, but rather a time limit when the vehicle is being driven in a manner that produces significant extra emission. So based on current daily usage (e.g., in the session so far), the vehicle might predict that 30 minutes of extended emission might be usable for the next hour, however, the number might drop quickly if the user drives aggressively for the next 30 minutes with out stopping or slowing.

When the user does not elect to continue mode usage at 405, the process 113 may engage mode limiting through the drive mode process 115 and change the vehicle 100 back to a different mode when it is safe to do so, to the extent it is not safe to do so immediately. This may potentially over-use credits or usage time, which could come from a future balance, or some degree of overflow may be permitted provided the user takes action within a certain amount of time to mitigate the usage and place the vehicle into a state where mode change is appropriate.

In one non-limiting example, a customer may elect to enable a special off-road mode, or presentation of such an option may be triggered by crossing a geo-fence associated with an off-road track, or detecting a beacon associated with such a track, or any other number of triggers. The vehicle 100 can determine, if it has not already, whether the vehicle 100 is within a geofenced track or proximate to such a track.

If the location does not appear to be appropriate, the vehicle 100 may still present the user with an option to override the location determination and engage the mode as requested, assuming there are no legal prohibitions against this. If the vehicle travels to a location where the laws dictate alternative mode usage (e.g., reversion to a "normal" mode), then the vehicle 100 may alert the owner and revert or instruct the owner to pull over when possible for reversion, if necessary. In a similar manner, if a usage-cap is exceeded, the vehicle 100 may alert the owner to the necessary mode reversion and/or pull-over.

Through the use of the illustrative embodiments and the like, it is possible to provide users with adaptable vehicle systems that can operate in high-performance modes and modified emission states while still remaining within regulatory boundaries. This lets users engage in the activities they want, while satisfying regulators that such vehicles will not represent excessive environmental impact.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A computer-implemented method comprising:
engaging an enhanced driving mode having a regulatory usage limitation limiting a total amount of mode usage associated therewith, in a vehicle, wherein usage-tracking is designated for usage of the driving mode;
tracking usage of the driving mode while the driving mode is engaged;
determining whether the regulatory usage limitation is exceeded, based on the tracked usage; and
reverting to a non-regulated driving mode responsive to a determination that the usage limitation is exceeded.

2. The method of claim 1, further comprising alerting a user that the usage limitation is exceeded when the usage limitation is exceeded.

3. The method of claim 1, wherein the method further comprises determining that the vehicle is in a state designated for mode reversion prior to the reverting.

4. The method of claim 1, wherein the tracking usage includes at least one of tracking aggregate usage or tracking emission production associated with mode usage.

\* \* \* \* \*